March 31, 1970    H. L. ETTMAN ET AL    3,503,399
RETENTION CATHETER WITH BALLOON SECURED THERETO BY AN
ADHESIVE PREVENTING PLASTICIZER MIGRATION
Filed Feb. 6, 1967
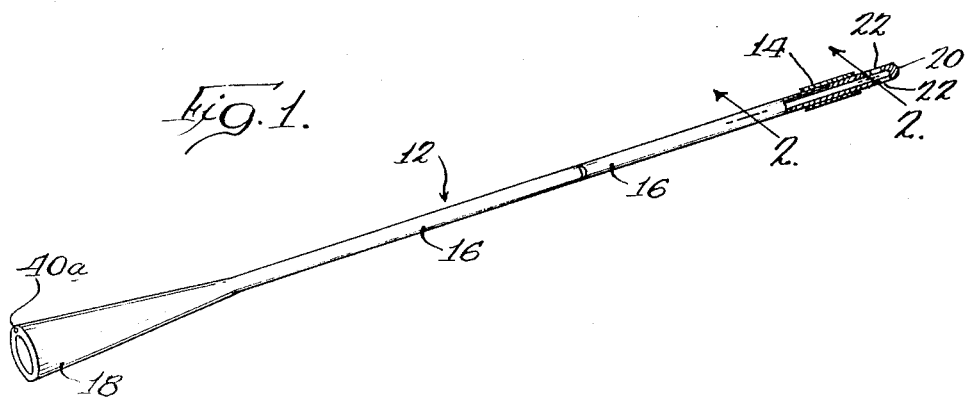
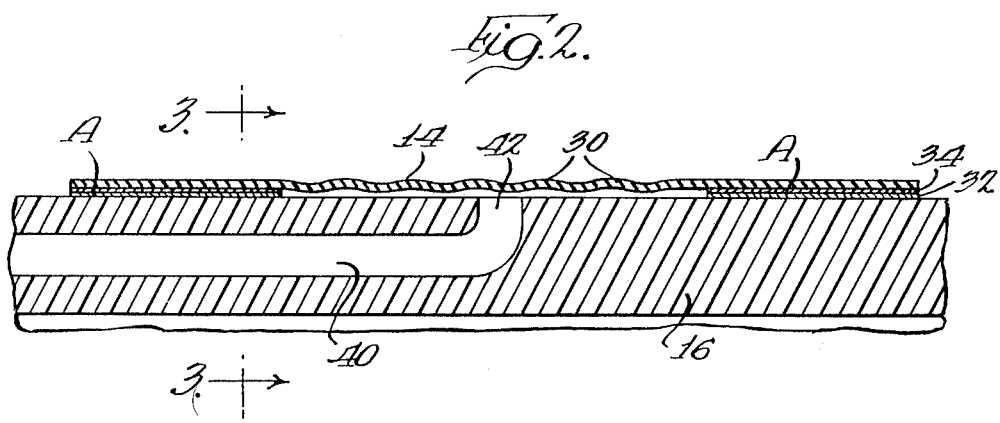
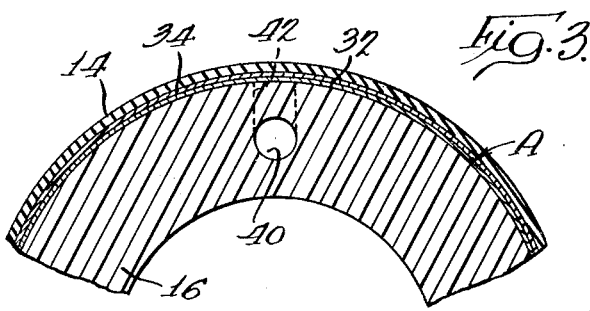
Inventors
Henry L. Ettman
Frank E. Kuester
John J. Weisz
Richard A. Clark
By Hofgren, Wegner,
Allen, Stellman & McCord
Atty's

# United States Patent Office 3,503,399
Patented Mar. 31, 1970

3,503,399
RETENTION CATHETER WITH BALLOON SECURED THERETO BY AN ADHESIVE PREVENTING PLASTICIZER MIGRATION
Henry L. Ettman, Clayton, Mo., Frank E. Kuester, Muskegon, Mich., John J. Weisz, Solon, Ohio, and Richard S. Clark, Muskegon, Mich., assignors to Brunswick Corporation, a corporation of Delaware
Filed Feb. 6, 1967, Ser. No. 614,207
Int. Cl. A61m 25/00
U.S. Cl. 128—349
20 Claims

ABSTRACT OF THE DISCLOSURE

An inflatable insertion catheter device including a plasticized polar plastic (e.g. polyvinylchloride) tube, a less or nonpolar plastic (e.g. rubber) balloon, and an adhesive system exemplified as having two layers, one of highly polar adhesive (e.g. nitrile rubber) adhered to the tube and the other of less polar adhesive (e.g. acrylic modified rubber) adhering the balloon to the first adhesive layer. The adhesive system has wetting characteristics and balanced surface energy characteristics providing excellent bond to both the polar and nonpolar surfaces. Preferably it includes a plasticizer migration blocking agent (e.g. isocyanate cross-linking agent).

---

This invention relates to inflatable insertion devices useful in medical applications and including an insertion tube having secured thereto one or more inflatable bulbs or balloons. More particularly the invention relates to such insertion devices wherein the balloons are secured by a special adhesive system.

Insertion devices having inflatable balloons are used for many medical purposes. For example, the Foley catheter is a common form of such device. In the Foley catheter the balloon is provided for the purpose of retaining the catheter tube against accidental removal during use. Other such devices having inflatable balloons include endotracheal tubes wherein the balloon is used for sealing a passage during use and Miller-Abbott tubes wherein the balloon is filled with a heavy fluid such as mercury and used for unblocking a body passage.

An excellent bond is required between the balloon and tube in such insertion devices for preventing damage to the device and to body tissues during use. For example, catheters are employed in various urological procedures such as for draining the bladder and the tissues which the catheter contacts during insertion and withdrawal are delicate and sensitive to the acceptance of the catheter. In an inflatable retention catheter, the balloon is conventionally provided as a rubber sleeve positioned around the catheter tube and bonded at its opposite ends to the exterior surface of the tube. An inflation passage is provided, usually extending longitudinally within the tube wall for introducing fluid into the balloon to inflate the balloon after the catheter is inserted in its proper use position. The inflated balloon acts as a retention means to prevent accidental withdrawal of the catheter.

Inflating the balloon places the bond between the tube and sleeve under stresses tending to cause the bond to creep and in some instances to rupture whereby the balloon or sleeve is pulled or torn away from the tube and presents an irregular surface which may scrape and irritate the delicate and sensitive tissues during withdrawal of the catheter. Also, the engagement of the balloon with the tissues, during normal insertion and withdrawal of the catheter, creates a frictional force tending to separate or peel the balloon from the tube.

In our work in securing balloons to tubes for making insertion devices of the type described above, and in our search for better tube materials, we have found that where the tube and balloon are of materials having appreciably different polarity, it is difficult to provide a sufficient adhesive bond between the materials. For example, aqueous media, such as body fluids, e.g. urine, adversely affect bonds formed from conventional adhesive systems between the balloon and the tube, weakening the bond whereby the balloon is susceptible to separation from the tube. Additionally, where a plasticized plastic such as plasticized polyvinyl chloride is used for the tube, the plasticizers may tend to migrate from the plastic into the bond and thereby lessen the cohesiveness of the bond and resultingly lower the resistance to bursting and peeling. We consider tubes made of such plasticized plastics to have highly advantageous characteristics for use in insertion devices.

It is a general object of this invention therefore to provide a new and useful inflatable balloon insertion device having improved resistance to separation of the balloon portion from the tube.

A more particular object is to provide a medical insertion device which includes a stretchable and elastic inflatable balloon in the form of a sleeve adhered to a tube by means of a flexible bond which is resistant to deterioration by contact with an aqueous medium and which has excellent bonding properties where the balloon and tube materials are of diverse polarity.

Another particular object of the invention is to provide such an insertion device including an inflatable elastic balloon adhered to a plasticized plastic tube by means of a flexible bond which physically blocks migration of plasticizer from the plastic into the bond.

Still another object of the invention is to provide such an insertion device having balloon and tube portions of differing polarity in which the bond between the balloon and tube is provided by a flexible cured adhesive system having proper wetting characteristics for the relatively polar surface and having proper surface energy characteristics which are balanced with the surface energy of both the polar surface and the nonpolar surface, whereby a strong and resistant bond is provided.

It is another object of the invention to provide a new and useful non-brittle, or flexible, adhesive bond system for adhering a nonpolar material, such as natural rubber, to a polar material, such as polyvinyl chloride, whereby the bond resists attack by aqueous media.

Another object is to provide such a bond system in which two adhesive layers are provided, a first of which adheres to the polar surface and the second of which adheres the nonpolar surface to the first adhesive layer.

Yet another object of this invention is to provide such a bond which is formed of ingredients which are not harmful to the body and which bond has low creep properties under stress for a prolonged period of time and includes a cross-linked matrix providing improved physical properties and resistance to deterioration of the bond.

A still further object is to provide a new and useful balloon-type insertion device including the bond system of any of the foregoing objects for adhering a natural rubber balloon to a polyvinyl chloride tube portion.

Other objects and advantages of the invention will be apparent from the following description and the drawing, in which:

FIG. 1 is a perspective view of an embodiment of the insertion device of this invention in the form of a retention catheter;

FIG. 2 is an enlarged fragmentary section taken substantially along the line 2—2 of FIG. 1; and FIG. 3 is a fragmentary section taken substantially along the line 3—3 of FIG. 2.

While this invention is susceptible of embodiment in many different forms, there is shown in the drawing and will herein be described in detail a specific embodiment of the invention, it being intended that the disclosure be considered as an exemplification of the principles of the invention and not limiting the invention to the single embodiment illustrated.

The illustrated catheter includes a polar flexible plastic tube 16, preferably formed of a plasticized plastic material, which is resistant to corrosion or degradation by such aqueous solutions as urine. The tube 16 is preferably semi-rigid, i.e. of sufficient stiffness for normal insertion but of sufficient flexibility to negotiate circuitous canals through which it may be inserted. An inflatable balloon 14 formed of elastic, substantially less polar or "nonpolar," plastic material, such as natural rubber, is provided adjacent the end 20 of the tube to be inserted. The balloon, or bulb, 14 is secured to the tube 16, by means of an adhesive system A which strongly joins the nonpolar material of balloon 14 to the relatively polar material of tube 16. Adhesive system A provides a flexible cured bond and has good wetting characteristics for the polar tube surface. The adhesive system also has surface energy characteristics effectively balanced with the surface energy of both the polar tube material and the nonpolar balloon material.

Where a plasticizer is included in the polar plastic, it is preferred that the plasticizer be of the nonmigratory type. Such plasticizers include high molecular weight polyesters and the epoxidized high molecular weight oils. For example, the plasticizer may be one of the alkyd-type polyester resins marketed by Rohm & Haas and can be under the tradename Paraplex G-25. Such polyester resins are based on long chain polybasic acids esterified with polyhydric alcohols such as glycerol or glycol. Also useful as plasticizers are the Paraplex epoxidized plasticizers such as Eastman NP 10, Paraplex G-60, G-61 and G-62 which are epoxidized high molecular weight oils.

With such plasticized tube materials, the bond system A preferably includes a cross-linked matrix for blocking migration of the plasticizer into the bond. In one preferred bonding system, the bond system A contains a plurality of layers including a first layer 32 having good wetting characteristics for the polar plastic and having surface energy characteristics balanced with the surface energy of the polar plastic and a second layer 34 which adheres to the first layer and balloon and thereby secures the nonpolar balloon to the first layer. The second layer 34 has surface energy characteristics effectively balanced with the surface energy of the nonpolar balloon material. The two layers are concurrently cured whereby the first layer bonds to the polar plastic and the second layer bonds the nonpolar plastic to the first layer. In the preferred multi-layer system, the cross-linked matrix, when used, is included in the first layer to block migration of plasticizer from the polar plastic surface.

As shown in FIGS. 1–3, the illustrated tube 16 is hollow and has an outwardly flared end 18. The insertion end 20 is bluntly rounded and drain ports 22 open through the tube wall near end 20. The interior of tube 16 forms a conduit from ports 22 to end 18 in the conventional manner in catheter construction.

Balloon 14 comprises an inflatable sleeve of natural rubber surrounding tube 16 and spaced axially from end 20 beyond ports 22. Balloon 14 may be pleated circumferentially as at 30 for improved expandability. The sleeve is secured at each end by the dull layer adhesive system A wherein layer 32 strongly adheres to the polyvinyl chloride surface of tube 16 and layer 34 adheres both to layer 32 and to the interior natural rubber surface of the sleeve forming balloon 14.

For inflating the balloon, a small conduit 40 is provided extending lengthwise within the wall of tube 16 from an inlet opening 40a at flared end 18 to an outlet port 42 at the outer surface of tube 16 within balloon 14. A suitable liquid-filled syringe (not shown) may be inserted in the inlet opening at end 18 for forcing liquid into balloon 14 to expand the balloon once the catheter has been inserted. The syringe may be provided with suitable valve means, or conduit 40 may be provided with an integral tubular extension and clamp or other means for blocking reverse flow of liquid from ballon 14 thereby to keep balloon 14 inflated as desired.

In the dual layer system A illustrated, layer 32 is a highly polar adhesive and layer 34 can be a much less polar adhesive. For example, layer 32 can be a rubber base adhesive in which the rubber is a polar rubber modified with another polar monomer or polymer. In certain specific catheters constructed and tested, for which test results are reported hereinbelow, layer 32 was an adhesive of nitrile rubber modified by copolymerization of butadiene and acrylonitrile and obtained from E. I. du Pont de Nemours & Co., Inc. under the trade designation Du Pont 56016. Layer 32 preferably includes a cross-linking agent such as a polyisocyanate, i.e. an isocyanate having at least two free isocyanate groups per molecule. These groups can be initially blocked and need only be free at cure temperature of the adhesive system. Specific examples of such cross-linking agents include toluene diisocyanate and other common di- and polyisocyanates including polyol adducts of polyisocyanate such as the adduct of about 1 mol trimethylol propane with about 3 mols toluene diisocyanate. Such a trimethylol propane modified toluene diisocyanate is available from E. I. du Pont de Nemours & Co., Inc. under the trade designation RC-805.

The second layer 34 can be, for example, a graft polymer of rubber and an acrylic acid ester formed by in situ solution polymerization of natural rubber and the acrylic acid ester. Suitable solutions of such graft polymers can be obtained under the trade name Heveatex, e.g. Heveatex X-3799, and can be further diluted with solvent as desired prior to use.

An example of the preparation of such a graft polymer is as follows. 10 gms. of masticated pale crepe are dissolved in 170 ccs. of toluene. 20 gms. of methyl methacrylate monomer, previously stripped of inhibitor by washing with potassium hydroxide solution, are added to the rubber solution and the mixture allowed to stand for 30 minutes. 1% of benzoyl peroxide, based upon the total methacrylate content, is added as a 2% solution in toluene (i.e. 10 ccs.). The whole is then heated in a suitable bath at 176° F. for a period of 10 hours under reflux having first flushed out the space above the solution in the reaction vessel with either $CO_2$ or nitrogen. During the first hour or so the viscosity drops sharply. After 10 hours the resultant solution should show a conversion of 55 to 60% of the original monomer with about 12 gms. of residual free monomer. The latter may be considered as solvent which will ultimately evaporate with the toluene leaving a dry film of graft polymer. The total solids of the resultant product from the above process is about 10% and should be reduced to 5% concentration with more toluene before use.

An accelerator can be added at this stage. The minimum dosage will depend upon the type of rubber compound used and conditions of cure, but for overall usage 3 parts of piperidine pentamethylene dithiocarbamate in 100 parts of the solution is recommended. This approximates to a saturated solution.

Smoked sheet can be used in place of pale crepe but imparts a darker color to the final solution. The viscosity of the masticated rubber is not critical. Lightly masticated rubber (80 Mooney) has been successfully used but results in initial solutions too viscous for easy handling. Well masticated rubber (down to 20 Mooney) gives viscous initial solutions and is therefore to be preferred.

Other acrylic esters which can be used to modify rubber to provide suitable graft polymer adhesives are the acrylic, methacrylic, ethacrylic and chloroacrylic acid esters such as methyl methacrylate, ethyl methacrylate, propyl methacrylate, butyl methacrylate, octyl methacrylate, dodecyl methacrylate, methyl acrylate, ethyl acrylate, octyl acrylate, dodecyl ethacrylate, methyl ethacrylate, octyl chloroacrylate, and the like.

A number of catheters embodying the invention were constructed by the following general procedure. A polyvinyl chloride tube was placed on a mandrel, and the rubber sleeve was placed over the tube to the desired approximate position covering the port 42 in FIG. 3. Both ends of the sleeve were then rolled back such that the rolled sleeve still covered port 42, and a polar adhesive consisting of a mix of 10 gms. Du Pont 56016 and 0.5 gm. Du Pont RC-805 in 5 ccs. methylethylketone was applied to the polyvinyl chloride tube at each end of the rolled sleeve. The adhesive layer 32 was permitted to airdry, and a layer of Heveatex X-3799, reduced with toluene to about 5% concentration as described above, was then applied thereover to form layer 34. This layer was also permitted to air-dry and was then moistened slightly with toluene, and the sleeve was unrolled over the layer 34. The assembly was cured in a mold at 275° F. for a total of about 15 minutes and was quenched in cold water. Any flash was removed and the bond can then be wiped as desired or needed with a solvent such as toluene or methylethylketone.

The polyvinyl chloride tube used was formed of a Bakelite Resin QYTQ-7 (polyvinyl chloride), obtainable from Union Carbide, which was plasticized with 60 parts by weight Paraplex G-25 and 15 parts by weight Paraplex G-62 for each 100 parts by weight QYTQ-7. The plasticized resin contained suitable stabilizer and pigments. The balloon was constructed of a latex rubber.

The catheters so produced were tested for burst and peel resistance as follows. Three sets of the catheters were made as described above and a control set of three was also prepared in the same manner except that the polar adhesive (Du Point 56016 plus RC-805) was omitted. Each set comprised five catheters, which were tested for burst strength. In the burst strength test the balloons were each inflated to normal capacity with 5 ccs. of water, and the inflation passage was closed so the balloon would not deflate. The catheter was then immersed in water at 100° F. for a period of 2 or 4 weeks as indicated in Table I below.

The burst tests were carried out by restraining the catheter balloon, inflated with the 5 ccs. of water, in a jig, and recording the force required to cause some type of failure when pulled on an Instron testing machine while the jaws of the Instron were separating at a rate of 10 in./min. The results are reported in Table I below as pounds of pull necssary to cause the catheter to fail.

On those samples which were not completely destroyed in the burst test, a peel test was performed. The peel test was conducted by maintaining the bond angle between the balloon and tube at 180 degrees and pulling the tube while holding the balloon to put stress on the bond at the leading edge thereof. The pull was increased until the balloon peeled from the tube, and the amount of pull was recorded for each sample and is reported in Table II.

TABLE I.—BURST STRENGTHS OF CATHETER ASSEMBLIES, LBS.

| Test No. | Immersion | | | Retained strength, Percent |
|---|---|---|---|---|
| | None | 2 weeks | 4 weeks | |
| 4 | 22.3 | 15.0 | | 67.3 |
| 5 | 21.9 | | 13.7 | 62.6 |
| 6 | 22.7 | 15.8 | | 69.6 |
| Control #2 | 19.9 | 11.6 | | 58.3 |

TABLE II.—PEEL STRENGTHS OF CATHETER ASSEMBLIES, LB./IN.

| Test No. | Immersion | | | Retained strength, Percent |
|---|---|---|---|---|
| | None | 2 weeks | 4 weeks | |
| 1 | [1] 9.45 | [2] 9.78 | | 103.5 |
| 2 | 9.55 | | [2] 8.86 | 92.8 |
| 3 | 9.26 | [1] 9.75 | | 105.3 |
| Control #1 | [1] 9.60 | 6.49 | | 67.6 |

[1] One catheter of five was completely destroyed in the burst strength test and could not be tested for peel strength.
[2] Two catheters of five were completely destroyed in the burst strength test and could not be tested for peel strength.

It should be noted that each balloon secured to the tube by the dual adhesive system had a peel strength of at least 8 lbs. and a burst strength of at least 13 lbs. after two weeks immersion in water. The control balloons, while not as good, also had good peel and burst strength properties when compared to the use of other adhesive systems.

Another series of catheters embodying the invention were constructed by the same general procedure given above, except that Du Pont RC-829 was substituted for the Du Pont RC-805. Du Pont RC-829 is reported to be a 60% solution of a polyfunctional polyisocyanate having free, i.e., unblocked, isocyanate groups in an anhydrous organic solvent which is soluble in ketones or esters. In this series catheters were prepared having ratios of RC-829:Du Pont Resin 56016 of 1:40, 1:20 and 1:10. Also, the open time of the adhesive component, i.e. the time before overcoating with the second layer of adhesive material and covering the rubber balloon, was also varied between 5 minutes and 18 hours. The burst and peel strength tests were run on the catheters, and the results were comparable to those obtained with the RC-805. The results of the burst and peel strength tests also indicated that increasing the level of the RC-829 improved the strength characteristics of the bond. Also, the open times indicated that a short time, e.g. 5 minutes open time, may not be sufficient to completely release solvent from the formulation, while an extended period of time, e.g. 18 hours, may permit reaction of the curing agent to an appreciable degree with atmospheric moisture. Both the short and extended times have some decreased effect on bond strength but the bond strength was still improved. An open time of about 15 minutes was considered adequate for complete solvent evaporation, and better strength was obtained at this open time. During the open time tests, however, the humidity level in the laboratory was high, so in a drier atmosphere an extended open time may be just as advantageous as the shorter time. As a result of the burst and peel strength tests conducted after two weeks of water immersion on catheters in this set, it was concluded that the RC-829 not only improved the initial bond strength but also improved the resistance of the bond to aqueous exposure. Catheters inflated with water gave no indication of deflating after four weeks immersion in water.

Another set of catheters was constructed using the same materials as set out above. The balloon forming sleeve was made to a wall thickness of about 4-6 mils, thicker than that used in the above examples, to improve the strength of the balloon wall. The in-mold cure for the adhesive was 5 min. at 285° F., after which the mold was removed and cure was continued out of the mold at 285° F. for an additional 15 or 20 min. as reported in Tables III and IV. This out-of-the-mold cure was for the purpose of stress relief of the bond. The catheters were tested in the manner described above for burst and peel strengths with and without water immersion and the results are reported in Tables III and IV.

TABLE III.—BURST STRENGTH OF CATHETER ASSEMBLIES, LBS.

| | Stress Relief Time, lbs. | |
|---|---|---|
| | 15 min. | 20 min. |
| No immersion, test No.: | | |
| 7 | 18.00 | 21.45 |
| 8 | 21.65 | 24.05 |
| 9 | 34.55 | |
| 10 | 19.10 | |
| 2 weeks immersion, test No.: | | |
| 11 | 24.30 | 16.00 |
| 12 | 18.30 | 20.30 |
| 13 | 21.90 | 19.45 |
| 14 | 19.30 | 20.45 |
| 15 | 21.25 | 23.60 |
| 16 | 20.85 | |

TABLE IV.—PEEL STRENGTHS OF CATHETER ASSEMBLIES, LBS./IN.

| | Stress Relief Time, lbs/in. | |
|---|---|---|
| | 15 Min. | 20 Min. |
| No immersion, test No.: | | |
| 17 | 12.61 | 13.44 |
| 18 | 12.94 | 14.25 |
| 19 | 16.76 | |
| 20 | 15.15 | |
| 2 weeks immersion, test No.: | | |
| 21 | 16.99 | 10.82 |
| 22 | 12.64 | 10.76 |
| 23 | 12.91 | 11.55 |
| 24 | 11.45 | 11.02 |
| 25 | 16.86 | 11.69 |
| 26 | 13.78 | |

Although the catheters of the above examples were made from plasticized polyvinyl chloride tube material and natural rubber balloon material, other suitable tube materials include extruded polyurethane and other plastics having suitable insertion tube properties, and other suitable balloon materials include synthetic rubber, mixtures of synthetic and natural rubbers, elastomeric polyurethanes, elastomeric polyvinyl chloride and other elastomeric plastics. Further, a variety of plasticizers can be used as needed or desired in any of the plastic tube materials, e.g. dioctyl phthalate and the like, and usually the tube material formulation will also include a mold release compound or extrusion lubricant such as zinc stearate. Further, wetting agents can be added to the adhesive system as desired to increase its wetting characteristics.

It is to be understood, of course, that the insertion device can be made in any of a variety of forms. For example, catheters or the like can be provided which have a plurality of airways or conduits 40 leading to the balloon and can have a plurality of passageways which extend to the tip of the catheter, e.g. in the commonly known three-way type of catheters, for use for flushing with antiseptic or bacteriostatic solutions or the like.

All percentages and parts given herein are by weight unless otherwise indicated.

We claim:

1. An insertion device of the type having at least one inflatable balloon, comprising: a plastic tube of highly polar plasticized plastic material; an elastic plastic balloon of a different and relatively substantially non-polar plastic material; a cured adhesive system preventing a significant bond weakening amount of plasticizer from migrating into the adhesive system from the plasticized plastic material, said adhesive system bonding and sealing said balloon to said tube so that the balloon is inflatable, said adhesive system also comprising two layers including a first layer cure-bonded to the polar plastic material and a second layer cure-bonded to the non-polar plastic material and to said first layer and said adhesive system further having a peel strength of at least 8 lbs. and a burst strength of at least 13 lbs. after two weeks immersion in water; and means for introducing a fluid into the space between said balloon and tube to inflate the balloon.

2. The insertion device of claim 1 wherein said adhesive system includes a cross-linked matrix for blocking migration of plasticizer from the polar plastic into the adhesive bond.

3. The insertion device of claim 2 wherein said cross-linked matrix holds the adhesive system with low creep under stress for a prolonged period of time.

4. The insertion device of claim 3 wherein the matrix is a cross-linked isocyanate and the isocyanate has at least two available isocyanate groups at the curing temperature of the adhesive system.

5. The insertion device of claim 1 wherein said cured first layer is a highly polar adhesive containing a cross-linked isocyanate matrix formed from an isocyanate having at least two available isocyanate groups at the curing temperature of said adhesive.

6. The article of claim 1 wherein said plasticized plastic is a plasticized polyvinyl chloride in which the plasticizer is a nonmigratory plasticizer.

7. The article of claim 6 wherein said plasticizer is selected from the group consisting of high molecular weight epoxidized oils, alkyd polyesters and mixtures thereof.

8. The article of claim 1 wherein said second layer comprises an acrylic ester graft polymer of rubber.

9. The article of claim 8 wherein said first layer includes a cross-linked isocyanate matrix for blocking migration of plasticizer from the polyvinyl chloride into the adhesive bond.

10. The article of claim 1 wherein said first layer is a cured highly polar nitrile rubber adhesive containing an isocyanate cross-linked matrix.

11. The article of claim 10 wherein the first layer comprises a butadieneacrylonitrile modified nitrile rubber.

12. The article of claim 11 wherein said nonpolar plastic is natural rubber and said second layer is a graft polymer adhesive having the structure defined by a natural rubber backbone with acrylic polymer chains grafted thereto.

13. The device of claim 1 wherein the plastic of said tube is plasticized with a migratory plasticizer.

14. The device of claim 1 wherein the plastic of said tube is vinyl plastic.

15. The device of claim 14 wherein the polar plastic is plasticized polyvinyl chloride and the plasticizer of the plasticized polyvinyl chloride is selected from the group consisting of polyester resin based on a long chain polybasic acid esterified with a polyhydric alcohol, epoxidized high molecular weight oil, and mixtures thereof.

16. The device of claim 1 wherein said first layer comprises a polar adhesive consisting essentially of nitrile rubber modified by copolymerization of butadiene and acrylonitrile and crosslinked with the adduct of about 1 mol of trimethylol propane with about 3 mols of toluene diisocyanate and said second layer comprises an adhesive consisting essentially of the graft polymer of rubber and an acrylic acid ester prepared by in situ solution polymerization of masticated pale crepe and methyl methacrylate monomer in the presence of a peroxide polymerization catalyst.

17. The device of claim 1 wherein said second layer comprises an acrylic ester graft polymer of rubber wherein the acrylic ester is selected from the class consisting of esters of acrylic, methacrylic, ethacrylic and chloroacrylic acids.

18. The device of claim 1 wherein said first layer comprises a polar adhesive consisting essentially of nitrile rubber modified by copolymerization of butadiene and acrylonitrile and crosslinked with the adduct of about 1 mol of trimethylol propane with about 3 mols of toluene diisocyanate and said second layer comprises an adhesive consisting essentially of the graft polymer of rubber and acrylic acid ester prepared by in situ solution polymerization of masticated pale crepe and methyl methacrylate monomer in the presence of a peroxide polymerization catalyst.

19. The device of claim 17 wherein said acrylic ester is selected from the class consisting of methyl methacrylate, ethyl methacrylate, propyl methacrylate, butyl methacrylate, octyl methacrylate, dodecyl methacrylate, methyl acrylate, ethyl acrylate, octyl acrylate, dodecyl ethacrylate, methyl ethacrylate, octyl chloroacrylate, and the like.

20. The insertion device of claim 1 wherein said cured adhesive system includes means blocking migration of the plasticizer from the polar plasticized plastic material into the adhesive system.

References Cited

UNITED STATES PATENTS

| | | | |
|---|---|---|---|
| 2,537,036 | 1/1951 | Colbeth | 161—256 X |
| 2,604,423 | 7/1952 | Slotterbeck et al. | 161—242 X |
| 2,905,582 | 9/1959 | Coleman et al. | 161—239 X |
| 3,075,863 | 1/1963 | Frey | 161—254 X |
| 3,111,450 | 11/1963 | Stevens | 161—190 X |
| 3,112,748 | 12/1963 | Colburn | 128—350 |
| 3,292,627 | 12/1966 | Harautuneian | 128—349 |
| 3,315,380 | 4/1967 | Mack et al. | 161—190 X |
| 3,355,347 | 11/1967 | Habermann | 161—256 X |

DALTON L. TRULUCK, Primary Examiner

U.S. Cl. X.R.

161—190, 242, 256

UNITED STATES PATENT OFFICE
CERTIFICATE OF CORRECTION

Patent No. 3,503,399                                March 31, 1970

Henry L. Ettman et al.

It is certified that error appears in the above identified patent and that said Letters Patent are hereby corrected as shown below:

In the heading to the printed specification, lines 7 and 8, "Richard S. Clark" should read -- Richard A. Clark --. In line 1 of Claims 6-12, delete the word "article" and insert -- insertion device --; In line 1 of Claims 13-19, before the word "device" insert the word -- insertion --.

Signed and sealed this 15th day of September 1970.

(SEAL)

Attest:

Edward M. Fletcher, Jr.                       WILLIAM E. SCHUYLER, JR.

Attesting Officer                                  Commissioner of Patents